Aug. 5, 1952  M. P. WINTHER  2,605,877
MAGNETIC CLUTCH
Filed Dec. 13, 1949

Martin P. Winther,
Inventor.
Haynes and Koenig
Attorneys.

Patented Aug. 5, 1952

2,605,877

UNITED STATES PATENT OFFICE 2,605,877

MAGNETIC CLUTCH

Martin P. Winther, Gates Mills, Ohio, assignor to
Martin P. Winther, as trustee

Application December 13, 1949, Serial No. 132,764

7 Claims. (Cl. 192—84)

This invention relates to magnetic clutches, and more particularly, to compound servo-actuated magnetic friction clutches and to clutch facings therefor.

Briefly, the invention is incorporated in a disc type, friction clutch having relatively rotary driving and driven clutch members. A compound or double clutch arrangement is shown but some phases of the invention are applicable to single clutch arrangements. One of the clutch members of each of the double clutches comprises a pair of pressure elements, at least one of the pressure elements being axially movable by magnetic attraction toward the other. The other rotary member of the clutch comprises an interposed clutch plate provided with clutch linings or facings. The clutch linings are of two types; first a magnetic type which may have characteristics of relatively low wear-resistance and frictional-coefficient, and; second a non-magnetic type having characteristics of relatively high wear-resistance and frictional-coefficient. A toroidal magnetic circuit is provided by an annular field coil so as to interlink both pressure elements, the magnetic field passing between the pressure elements and through the plate and clutch lining in areas having the magnetic clutch linings. Other areas of the clutch faces are provided with the clutch linings having wear-resistant high-friction properties. These wear-resistant linings are particularly adapted to resist wear, stress and strain caused by servo-action wedge closure operators, such servo-action being preferably incorporated in the clutch. The servo closure operators are arranged and mounted so as to provide improved servo action and simplicity of construction. In the compound or double clutch arrangement the electromagnetic circuits are arranged and operated to prevent skip driving action between clutch closures. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

The accompanying drawing, in which one of various possible embodiments of the invention is illustrated, is a longitudinal section of an electromagnetic clutch incorporating the invention.

Conventional non-magnetic clutch facings between the pressure elements of a magnetic clutch interpose a high-reluctance gap in the magnetic circuit and therefore necessitate a relatively large magnetizing force requiring large field coils and large excitation current. This difficulty has been met by the provision of magnetic clutch facings or linings of magnetic permeability higher than that of conventional linings but lower than that of the adjacent ferrous clutch faces, such as are disclosed, for example, in the copending application of Anthony Winther, Serial No. 91,792, filed May 6, 1949, for Magnetic Clutch, now Patent No. 2,580,869, and in my copending application, Serial No. 110,211, filed August 13, 1949 for Magnetic Clutch and Lining Therefor. While such magnetic clutch facings have been an improvement over former constructions, they do not ordinarily have the wear-resistant or high friction characteristics of conventional non-magnetic clutch linings under severe operating conditions such as envisaged herein, and as a result their life in this class of service may be less than the life of a corresponding conventional lining. Moreover, it is difficult, though not impossible, to obtain a satisfactory frictional coefficient, for example .03, while also providing the desired high magnetic permeability.

The wear-resistant quality of a clutch facing becomes especially important where the clutch incorporates servo-action wedge operators, such as will be described below. The wedge operators desirably increase the clutch closing pressures for transmission of greater torque, but with danger of an attendant increased wearing effect on magnetic clutch linings which the present invention overcomes.

Referring now to the drawing, there is shown a compound or double magnetic clutch of the disc type, particularly adapted for automotive transmission requiring two power input members driven from a single power source. A drive shaft, for example, the crank shaft of an automotive engine is indicated at 1 and has a flange 3. The flange 3 is bolted to a hub 5 of a driving assembly forming the driving member of the clutch. The driving member includes end walls 7 and 9 and an interposed and a magnetic ring assembly or field member 11 formed by welded magnetic rings 11A, 11B and 11C. The cross section of assembly 11 is S-shaped. The hub 5, the end walls 7 and 9 and the assembly 11 are all rigidly secured together. Numeral 2 indicates a conventional starter gear.

Steel clutch plates 13 and 15 are positioned on opposite sides of the pressure element 11, the plates being selectively operable driven members of the compound clutch, each being the driven element of one clutch. The clutch plate 13 is spring mounted on a hub 17 by vibration dampers 19 of conventional construction requiring no further description. The hub 17 is splined to a driven shaft or member 21. The other clutch plate 15 is riveted to a second hub 23. Hub 23 is splined to a quill 25 rotary around the shaft 21 and constituting a second driven member. Shaft 21 is coaxially aligned with the drive shaft 1 by a pilot bearing 27 supported in the hub 5 of the driving member. The quill 25 is exteriorly journalled in a suitable bearing 4 supported in the clutch housing or frame, part of which appears at 6. A pilot bearing 8 aligns the quill in one end of a sleeve 10 extending from plate 9. The other end of the sleeve 10 is supported upon a bearing 12 in housing 6.

Returning to the driving member, the S-shaped assembly 11 forms two annular grooves 35 and 37 in opposite faces 39 and 41. The grooves 35 and 37 contain annular field coils 43 and 45. The field coils are adapted to be individually excited by current introduced through brushes 47 and 49, serving the coils through collector rings 51 and 53. A circuit for each coil is completed through the metal parts of the assembly to sleeve 10 and through a grounding brush 55. The collector rings 51 and 53 are supported in insulated relation on the sleeve 10 and are connected to the coils by suitable wiring 50 for the purpose.

Inasmuch as there is shown a double clutch with a common pressure element 11 and similar parts on each side thereof, the subsequent description of similar elements will refer only to the construction of one clutch per se, it being understood the other clutch is the same in principle. Since it has only different dimensions of similar parts, corresponding reference characters indicating such similar parts are primed.

On the outside of clutch plate 13 is a floating, magnetic pressure element or ring 59 which is axially and rotatably movable relative to the assembly 11. The element 59 is connected to the ring assembly of the driven member by means of an inwardly positioned resilient artificial rubber or like ring 61 and by means of outwardly positioned wedge operators 63. The resilient ring 61 is compressed within an inner rim 65 on the pressure element and seats in a groove 68 in the flange 5 of the ring assembly.

There are a number of wedge operators, for example, six symmetrically disposed around and adjacent the periphery of the floating pressure ring. Each comprises a hardened steel ball 69 contained by conical seating cavities 71 and 72 within hardened steel insert members 73 and 74, respectively press fitted into openings in the ring assembly end wall 7 and into the back of the floating pressure ring 59. A floating retaining ring 75, having ball receiving apertures, links the balls of the group of wedge operators.

The ring 61 resiliently drives pressure element 59 when the latter is free (clutch open) but permits 59 to lag when its rotation is resisted, as when engaging the faced disc 13 during clutch closure. By toroidal rolling or twisting action it allows for axial movement of 59 while supporting it. When element 59 and plate 13 are disengaged, the conical seating cavities 71 and 72 are aligned. When the element 59 is brought into engagement with plate 13, and with a relative rotation therebetween, a drag occurs on the floating element 59 which causes it to lag with respect to assembly 11 and wall 7. The seating cavities 71 and 72 are then disaligned with a resultant servo wedging action causing the floating pressure element 59 to be forced axially toward the other pressure element 11 for completing clutch engagement by squeezing the sandwiched disc or plate 13.

The clutch is initially engaged by magnetic attraction of the magnetic pressure elements 11 and 59. An annular recess 77 is formed in the face 79 of the floating element 59 and opposite the groove 35 in the face of the assembly 11. A magnetic circuit or iron path is thus provided around the field coil 43. This carries a toroidal flux field F induced by the field coil 43 interlinking both pressure elements 11 and 59 (see the top of the drawing). The magnetic path between the elements includes the magnetic plate 13 and certain of the associated clutch facings. These are so constructed as to reduce the reluctance of the magnetic path. Thus ring-like facings 81 of low magnetic reluctance are secured on opposite sides of the clutch plate 13 inside of the recesses 35 and 77 in the pressure elements. Similar ring-like facings 83 of low magnetic reluctance are secured on opposite faces of the clutch plate outside of the recesses in the pressure elements. The outer facings 83 do not extend to the outer periphery of the disc. On the outer marginal plate portions are attached ring-like facings 85 of a conventional, wear-resistant character such as ordinary non-magnetic clutch facing. The facings 81, 83 and 85 are attached by riveting or by the use of clutch or brake facing cement, both of which are known for the purpose. If desired the facings may be attached to the pressure rings, instead of the disc.

Magnetic clutch facings are disclosed in the above mentioned applications, Serial No. 91,792, now Patent No. 2,580,869 and Serial No. 110,210. Generally, magnetic facings comprise a tough and resilient base material, such as employed for conventional clutch facings and brake linings, in which is dispersed a finely divided magnetic substance, for example, iron powder. The iron content determines the magnetic permeability of the facing, hence it should be as high as possible without detracting unduly from the strength and frictional-coefficient of the facing. An exemplary mixture is as follows:

| Items: | Parts by weight |
|---|---|
| Iron powder (99.7% pure iron) ranging in size from 8 to 25 microns and substantially spherical in shape | 35 |
| Shredded asbestos yarn fibre (short pieces ½ to ¾ inches long) | 4 |
| Short pieces of brass wire (about .010 inch diameter mixed with the asbestos) | 2 |
| Barytes | 3 |
| Graphite | 1 |
| Powdered, uncured phenolic resin | 10 |

The mixture is formed as a facing and cured with heat and pressure, preferably, though not necessarily while under the influence of a strong magnetic field which is established parallel to the expected direction of the operating magnetic field through the resulting facing. This expected direction is normal to the facing considered as a sheet. Such orientation of the granulated magnetic substance further reduces the reluctance of the facing in the desired direction. This orientation feature may be omitted. It is described more in particular in said application Serial No. 110,211.

Conventional clutch facings are well known. They generally comprise a mixture of substances adapted to withstand frictional wear and heat while also providing a smooth action and high coefficient of friction. Asbestos fibre, brass wire and a binding agent are commonly employed. Conventional facings have superior wear resistance over magnetic facings because they do not include the magnetic particles, which necessarily form a substantial part of the magnetic facings.

As indicated in the drawing, the non-magnetic wear-resistant facings 85 are appreciably thicker than the magnetic linings 81 and 83. Suitable recesses 87 and 89 are provided in the pressure elements 11 and 59 respectively, to accommodate the greater thickness of facings 85 and provide substantially coincident engagement of all facings with the respective pressure elements.

Operation of the described left-hand clutch is as follows:

The clutch ring assembly including the end walls 7 and 9, and the interposed pressure element 11 is driven by the drive shaft 1, floating pressure element 59 being also rotated therewith. This is because 59 is interconnected with the ring assembly by the supporting resilient ring 61. With field coil 43 unexcited, there is no axial force tending to close the elements, and they rotate with negligible frictional interaction with plate 13. The friction is insufficient to overcome the resistance of the resilient ring 61 to angular displacement of the floating element relative to the ring assembly. Therefore, the ball seating members 71 and 73 are essentially aligned.

When the field coil is excited, the floating pressure element 59 is initially drawn against outer facings 81, 83 and 85 of the clutch plate 13. This is because toroidal magnetic field F interlinks the two pressure elements, passing therebetween through the magnetic plate 13 and the magnetic facings 81 and 83 but not through facings 85 which are highly reluctant. The frictional engagement of the clutch members results in a drag by plate 13 and lag or displacement of the floating elements 59. This disaligns the ball seats 73 and 74 and a servo wedging action results which forces the floating pressure element 59 toward the other pressure element 11, the interposed plate 13 being in turn driven against the axially fixed pressure element. The result is, through the facings 81, 83 and 85, to grip plate 13 and angularly to accelerate it. The speeds of the pressure elements 11, 13 and 59 then become synchronous, under which condition lag between the floating element and the ring assembly ceases and no further compression occurs, its limiting value being determined by the cone angles of seats 71 and 72 and by the force associated with the torque which is being transmitted.

The clutch is disengaged by deexciting the field coil 43. A release of the wedge operators is assured by the bias on the stressed resilient ring 61 tending to return the floating pressure element to its initial position in which pockets 71 and 72 are essentially aligned. Moreover, the cone angles of the seats 71 and 72 are such as to prevent permanent locking with the balls 69, so that elements 63 tend automatically to release and center themselves.

After a short period of initial wear on the magnetic facings 81 and 83 the more wear-resistant non-magnetic facings 85 bear the major portion of compression occurring during clutch engagement, for example, 75 to 80 percent. The magnetic facings 81 and 83, having incipiently worn back more rapidly, are then relatively lightly loaded, their primary purpose being to fill the gap between the plate 13 and the elements 11 and 59 and to provide a low reluctance path therebetween.

Continued adjustment of load to the stated conditions is assured by the process of wear or lapping under conditions of operation. The magnetic facings 81 and 83 wear relatively rapidly so that they relieve themselves of some load to the extent that the non-magnetic facings 85 are engaged and primarily loaded. Further wear is resisted by the tough non-magnetic facings 85. The major portion of the driving torque is transmitted through the non-magnetic facings, because of their greater diameter and because of their higher frictional coefficient as compared to that of the magnetic facings.

The provision of magnetic facings in the magnetic path is also advantageous because of their wearing character which permits self-adjustment to the most efficient thickness to fill what would otherwise be a magnetic gap. Any wear in the non-magnetic facings is accommodated by additional wear in the magnetic facings. The construction permits use of a higher iron content in the magnetic facings than might otherwise be practical. Thus the invention broadly comprises the feature of providing a wear-resistant, high frictional-coefficient facing between clutch members over a part of a clutch face, the other part of the clutch face comprising magnetic material for providing a low reluctance magnetic circuit interlinking the pressure elements. The servo operators 63 supply the additional axial forces which the non-magnetic facings 85 can withstand and which mere magnetic attraction could not provide without a high magneto-motive force requiring large coils and large excitation. The wedge operators 63 are positioned substantially opposite the non-magnetic facings 85, assuring a substantially direct compressive action.

The above description applies also to the similar prime-indexed parts on the right side of the drawing constituting the right-hand clutch. It will be observed that the left-hand clutch supplies power to shaft 21 whereas the right-hand clutch supplies power to the quill 25. Individual excitation of coil 45 closes the right-hand clutch by providing the toroidal flux field F'' (see the upper half of the drawing). The clock direction of current flow through coils 43 and 45 is the same, so that according to the right-hand rule the flux vectors are in the same clock direction as shown by the arrows on fields F and F''. The fields F and F'' are both indicated in the top half of the drawing, but it will be understood that they will respectively occur only if either one or the other of the coils 43 or 45 is excited. If both coils are excited at the same time (current in the same clock direction therein as stated), then the portions of these flux fields F and F'' between the coils 43 and 45 cancel one another and a single loop (instead of two loops) of flux occurs, such as suggested at S in the lower half of the drawing. Under the condition indicated at S (coils 43 and 45 excited simultaneously) both clutches are closed, the mode of closing of each being as already made clear.

In any transmission served by the clutch, it is desirable that there be no period of power skip between the time that one clutch is opened and the other is closed. It will therefore be understood that coil 45 may be first individually excited, providing toroidal flux field F'' to close the right-hand clutch. Before coil 45 is deexcited and thus before field F'' disappears, coil 43 is excited so as to provide the field condition S shown at the bottom of the drawing. Thus both clutches are closed. Then coil 45 is deexcited, so that only flux field F remains to retain the left-hand clutch closed. The right-hand clutch then opens.

When both coils 43 and 45 are deexcited, F, F' and S all disappear. The converse of the above sequence of flux field generation occurs if coil 43 is first excited, then coil 45 excited before 43 is deexcited, and coil 45 finally exclusively excited. In this case the left-hand clutch will first close, then the right-hand clutch will close and subsequently the left-hand clutch will open. Thus power skip is prevented.

Whereas a clutch is described by way of example, it will be understood the invention has application to brakes, a brake being a form of clutch, as understood by those skilled in the art. The terms are to be understood herein as synonymous.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A magnetic clutch comprising a rotary member, a field ring driven by said rotary member, means for exciting a toroidal flux field in said field ring, a magnetic pressure ring adapted to be interlinked by said flux field and attracted, a ring composed of resilient material and interposed between the rotary member and the pressure ring to support the latter for limited axial movement and for rotary lagging movement, a driven clutch plate interposed between the field ring and the pressure ring, and a lag-operated wedge mechanism between the rotary member and the pressure ring, whereby upon excitation of the field ring with consequent attraction of the pressure ring toward the driven plate and with resulting lag of the pressure ring, said mechanism will act to force the pressure ring to clamp said driven plate.

2. A clutch made according to claim 1, wherein a friction liner which is non-magnetic and relatively more wear-resistant in one part and magnetic but relatively less wear-resistant in another part is interposed between the driven plate and the field and pressure rings respectively.

3. A clutch made according to claim 1, wherein a facing which is non-magnetic in an outer annular part and magnetic in an inner annular part is interposed between the driven plate and the field and pressure rings respectively, and wherein the wedge mechanism is located substantially opposite said outer annular part.

4. A clutch comprising a rotary member, a field ring driven by said rotary member, annular coils in said field ring adapted when individually excited to establish about each coil respectively an individual toroidal flux field, the clock directions of exciting current in said coils being the same whereby when both coils are excited a single toroidal flux field surrounds them in the same direction, magnetic pressure rings on opposite sides of the field ring adapted respectively to be interlinked by respective ones of said individual toroidal fields and both to be interlinked by said single toroidal flux field, and driven plates respectively located between respective ones of said pressure rings and the field ring.

5. A clutch made according to claim 4, wherein facings are interposed on opposite sides of the respective driven plates, outer portions of said facings being relatively non-magnetic and inner portions thereof being substantially magnetic for interlinkage by said flux fields.

6. A clutch made according to claim 4, wherein facings are interposed on opposite sides of the respective driven plates, outer portions of said facings being substantially non-magnetic and inner portions thereof being substantially magnetic for interlinkage by said flux fields, and wherein the pressure rings are supported with respect to said rotary member by annular resilient rings of circular cross section allowing limited axial and lagging movements of said pressure rings, and wherein lag-operated wedge servo mechanisms are respectively interposed between the pressure rings and said rotary member, said mechanisms being in a position to apply thrust primarily through said outer substantially non-magnetic facings.

7. A magnetic clutch comprising a frame, a rotary driving member axially fixed with respect to the frame, a driving field ring connected with said rotary member and also axially fixed with respect to the frame, means for exciting a toroidal flux field in said field ring, a magnetic pressure ring adapted to be interlinked by said flux field and to be attracted toward the field ring, said pressure ring being supported on the rotary driving member for axial movement with respect to the frame and for rotary lagging movement with respect to the rotary driving member, a magnetic driven clutch plate which is axially movable with respect to the field ring interposed between the field ring and the pressure ring, an outer non-magnetic relatively greater wear-resisting annular liner and an inner magnetic relatively less wear-resisting annular liner, both liners being interposed between the driven plate and the field and pressure rings respectively, the flux field of the field ring passing substantially only through the inner liner, and a lag-operated wedge mechanism operative between the rotary member and the pressure ring and located substantially opposite said outer liner, whereby, upon excitation of the field ring with consequent attraction of the pressure ring toward the clutch plate and with resulting lag of the pressure ring, said mechanism will act to force the pressure ring to force said driven plate against the field ring.

MARTIN P. WINTHER.

REFERENCES CITED

The following references are of record in the file of this patent:

UNITED STATES PATENTS

| Number | Name | Date |
|---|---|---|
| 741,895 | Earll | Oct. 20, 1903 |
| 762,622 | Eastwood | June 14, 1904 |
| 1,655,827 | Stanley | Jan. 10, 1928 |
| 1,756,907 | Payne | Apr. 29, 1930 |
| 2,017,915 | Moorhouse | Oct. 22, 1935 |
| 2,070,813 | Stearns et al. | Feb. 16, 1937 |
| 2,230,520 | Wemp | Feb. 4, 1941 |
| 2,279,986 | Griswold | Apr. 14, 1942 |
| 2,338,693 | Dolan | Jan. 4, 1944 |
| 2,351,598 | Cadman | June 20, 1944 |
| 2,407,022 | Lambert | Sept. 3, 1946 |

FOREIGN PATENTS

| Number | Country | Date |
|---|---|---|
| 474,053 | France | Feb. 15, 1915 |
| 556,182 | England | Sept. 23, 1943 |
| 599,540 | England | Mar. 15, 1948 |